350-321 SEARCH ROO

INVENTORS
HAROLD FLEISHER
THOMAS J. HARRIS

BY Sughrue, Rothwell, Mion, Zinn & Macpeak
ATTORNEYS

VERY HIGH CAPACITY OPTICAL MEMORY SYSTEM

Filed Jan. 15, 1968 2 Sheets-Sheet 2

United States Patent Office 3,533,682
Patented Oct. 13, 1970

3,533,682
VERY HIGH CAPACITY OPTICAL MEMORY SYSTEM

Harold Fleisher and Thomas J. Harris, Poughkeepsie, N.Y., assignors to International Business Machines Corporation, Armonk, N.Y., a corporation of New York Filed Jan. 15, 1968, Ser. No. 697,709
Int. Cl. G02f 3/00
U.S. Cl. 350—321 7 Claims

ABSTRACT OF THE DISCLOSURE

Bits of information are stored in fields on an optical memory plane. The plane may be a photographic film consisting of transparent and opaque spots, transparent and reflecting spots, or a wavelength responsive film prepared by the Lippmann process. A digital light deflector directs a linearly polarized laser beam to illuminate one field which is magnified and imaged by plural stages of lens arrays on one input of an optical AND gate. A readout laser directs another linearly polarized beam onto the other input of the AND gate to illuminate the bit positions of a word to be read out. The optical AND gate functions to produce an optical output whenever there is a coincidence of bits on both inputs of the AND gate. This optical output is detected by an analyzer and directed upon a matrix of photodetectors equal in number to the maximum number of bits to be read out. The capacity of the system may be increased by using an optical memory in the form of a film prepared by a Lippmann process and adding to this system laser frequency selecting means. The system may be modified to provide for writing data into memory by placing a photographic memory plate in an automatic developer and adding electro-optical switching arrays to each stage of lens arrays.

CROSS REFERENCES TO RELATED APPLICATIONS

A related application entitled "Optical AND Gate" filed by Fleisher et al. now Pat. No. 3,448,282, issued June 6, 1969, and assigned to the assignee of the present application describes the details of the optical AND gate which forms a part of the memory system of this application.

BACKGROUND OF THE INVENTION

The invention relates to the field of read only optical memory systems.

SUMMARY OF THE INVENTION

The object of the invention is to provide an improved optical read only memory which has an extremely high capacity, provides parallel read out of a block of data, provides high speed, random access to a block of data, has a very high data rate, and has a very low cost per data bit. Data is read out from an optical memory plane by means of a laser beam which selects one field in the plane consisting of X columns and Y rows of information fields. The information fields are divided into a plurality of blocks each containing the same number of fields. A plurality of stages of lens arrays functions to magnify the selected field and image it on one input of an optical AND gate. A laser beam directed to the other input of the AND gate selects the bits in the field which are to be read out, and the output of the AND gate corresponds to the selected bits.

BRIEF DESCRIPTION OF THE DRAWING

FIG. 3 is a modification of FIG. 1 incorporating a Lippmann film memory which increases the capacity of the system of FIG. 1; and FIG. 4 is a block diagram showing the manner in which FIG. 1 is modified to permit information to be written into the memory.

DESCRIPTION OF THE PREFERRED EMBODIMENT

Figure 1:
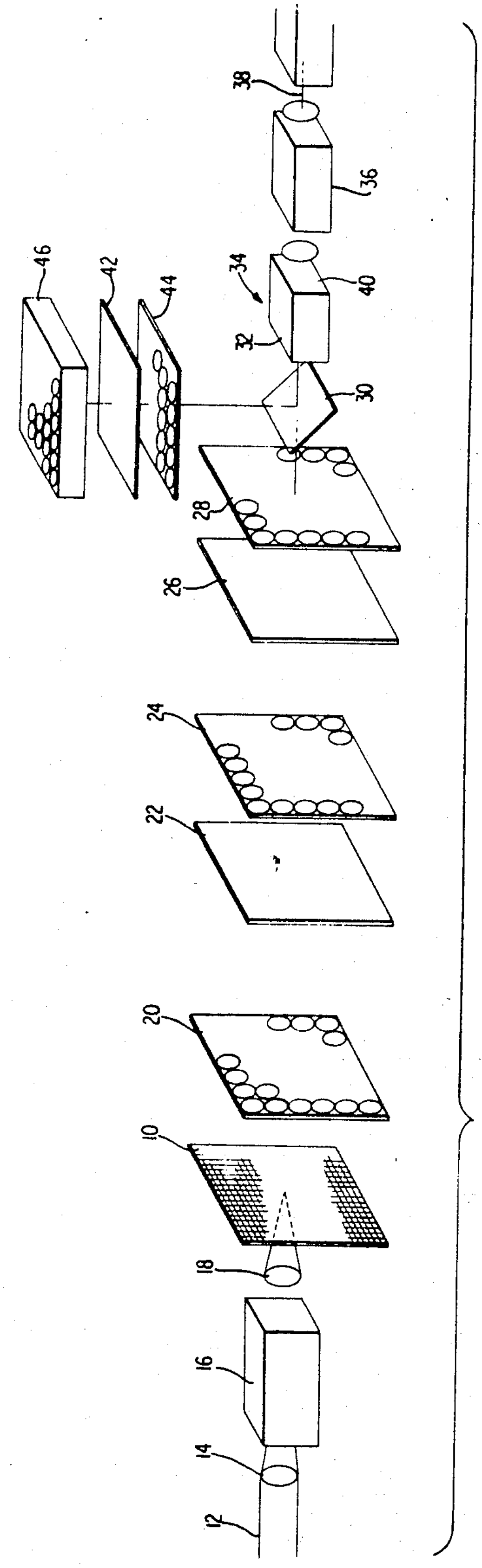
FIG. 1 is a schematic diagram illustrating a preferred embodiment of the improved system for reading out information from an optical memory.

FIG. 1 illustrates the preferred embodiment of the improved very high capacity, optical read only memory system. The optical memory device to store the information to be read out may take any number of forms. However, in the system shown in FIG. 1, the information is stored on a memory plane 10 as opaque or transparent spots. The plane 10, for example, could consist of conventional high resolution black and white photographic plates or metal reflecting spots on glass.

The memory plane is divided into $10^6$ blocks (1000 by 1000) and each block contains 2500 bits (50 by 50). The capacity of the memory plane is therefore 2.5 times $10^9$ bits. A linearly polarized laser beam 12 is focused by a lens 14 through a digital light deflector 16 and another lens system 18 to illuminate one of the blocks in memory plane 10.

A lens array 20 consists of 100 (10 by 10) lenses which are arranged so that any field of 100 x 100 blocks in the memory can be registered and imaged on an image plane 22. The lens array effectively divides the memory plane into 100 fields, each with 10,000 blocks. Therefore, image plane 22 contains 10,000 blocks (100 by 100) magnified in size by a factor of 10. Only one field is illuminated at a time by deflector 16, and the blocks in corresponding positions of each field are imaged by array 20 in the same block plane 22 when they are selected by deflector 16.

The lenses in another lens array 24 are arranged to image and register each group of blocks in image plane 22 on another image plane 26. Lens array 24 contains 100 lenses which effectively divide the groups of blocks in image plane 22 into 100 groups of blocks of 100 blocks each. Therefore, image plane 26 contains 100 blocks (10 by 10) magnified by a factor of 10 relative to image plane 22. Corresponding blocks in each of the 100 groups of blocks are imaged in the same position on plane 26. Image planes 22 and 26 could each physically consist of a coherent optical fiber face plate.

The lenses in another lens array 28 are arranged to image and register through a beam splitter 30 each of the 100 blocks in image plane 26 onto one input 32 of a polarization-sensitive optical AND gate 34. The details of the optical AND gate are presented in the patent to Fleisher et al. cross-referenced above. Lens array 28 also contains 100 lenses and functions to select one block in plane 26 and image it on input 32. In this case, the magnification could be 1 to 1.

Therefore, there is a 2500 (50 by 50) bit field image on the input 32 of optical AND gate 34. A word to be read out of the field is selected by digital light deflector 36. Deflector 36 directs a linearly polarized light beam 38 to the other input 40 of AND gate 34. The beam covers the bit positions of the word to be read out. The size of the word can vary from one bit to 2500 bits by adjusting the size of the beam 38 from deflector 36. Beam 38 is linearly polarized in a direction which is blocked by an analyzer 42. The optical AND gate 34 functions such that the state of polarization of the beam 38 is changed when the beam impinges upon a position of input 40 which corresponds to a bit or illuminated spot on the input 32. Consequently, bit positions of the field imaged on input 32 which contains bits, i.e. light rather than dark spots, cause the light beam 38 corresponding to these positions to be changed in polarization in passing through AND gate 34. The beam is reflected from beam splitter 30 through another lens array 44 to analyzer 42. Some light will pass through the analyzer to a matrix of photodetectors 46 which convert the light passed by analyzer 42 to corresponding appropriate electrical signals. The bit positions in the field illuminated by the beam 38 which contain 0 bits, i.e. dark spots, permit the beam 38 to pass through AND gate 34 without any change in polarization of the beam and consequently the light in these positions is blocked by the analyzer 42 and there is no corresponding electrical output from the photodetectors 46. The number of photodetectors in the matrix 46 is equal to the largest number of bits to be read out by the beam deflector 36.

If fields larger than 50 by 50 bits are required, it is possible to increase the field size and decrease the number of fields such that the total capacity of the system remains the same. The product of the numbers of lenses in the respective stages must equal the number of blocks in the memory plane. In the three-stage embodiment of FIG. 1, each stage contains 100 lenses and (100)(100)(100) equals (1000)(1000) or one million, the number of blocks in memory plane 10.

Figure 2:
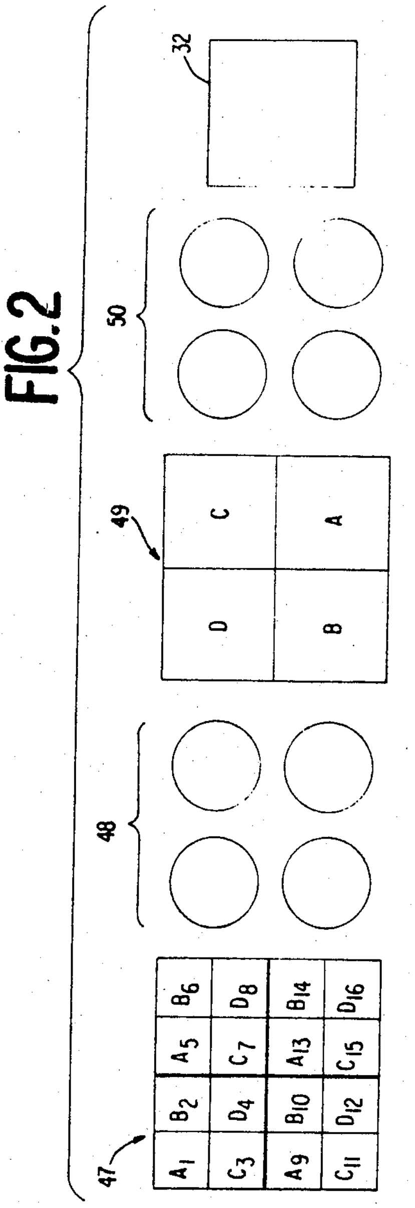
FIG. 2 is a diagram explaining the optics used in FIG. 1.

FIG. 2 illustrates the manner in which the lens arrays function to select a field. Let us assume a memory plane 47 having sixteen blocks arranged into four fields which correspond to a lens array 48 consisting of four lenses. The four fields consist of the following blocks: $A_1B_2C_3D_4$; $A_5B_6C_7D_8$; $A_9B_{10}C_{11}D_{12}$; and $A_{13}B_{14}C_{15}D_{16}$. An image plane 49 contains four areas labeled A, B, C and D. For example, if one of the memory blocks $A_1$, $A_5$, $A_9$ or $A_{13}$ is illuminated by a laser beam, lens array 48 will image the illuminated block in area A in plane 49 with a magnification of 4. Similarly, when any one of the B blocks of memory 47 is illuminated, it will be imaged on the B area of plane 49, etc. The four lenses in lens array 50 then image the block from plane 49 on input 32 of the optical AND gate 34.

Figures 3, 4:
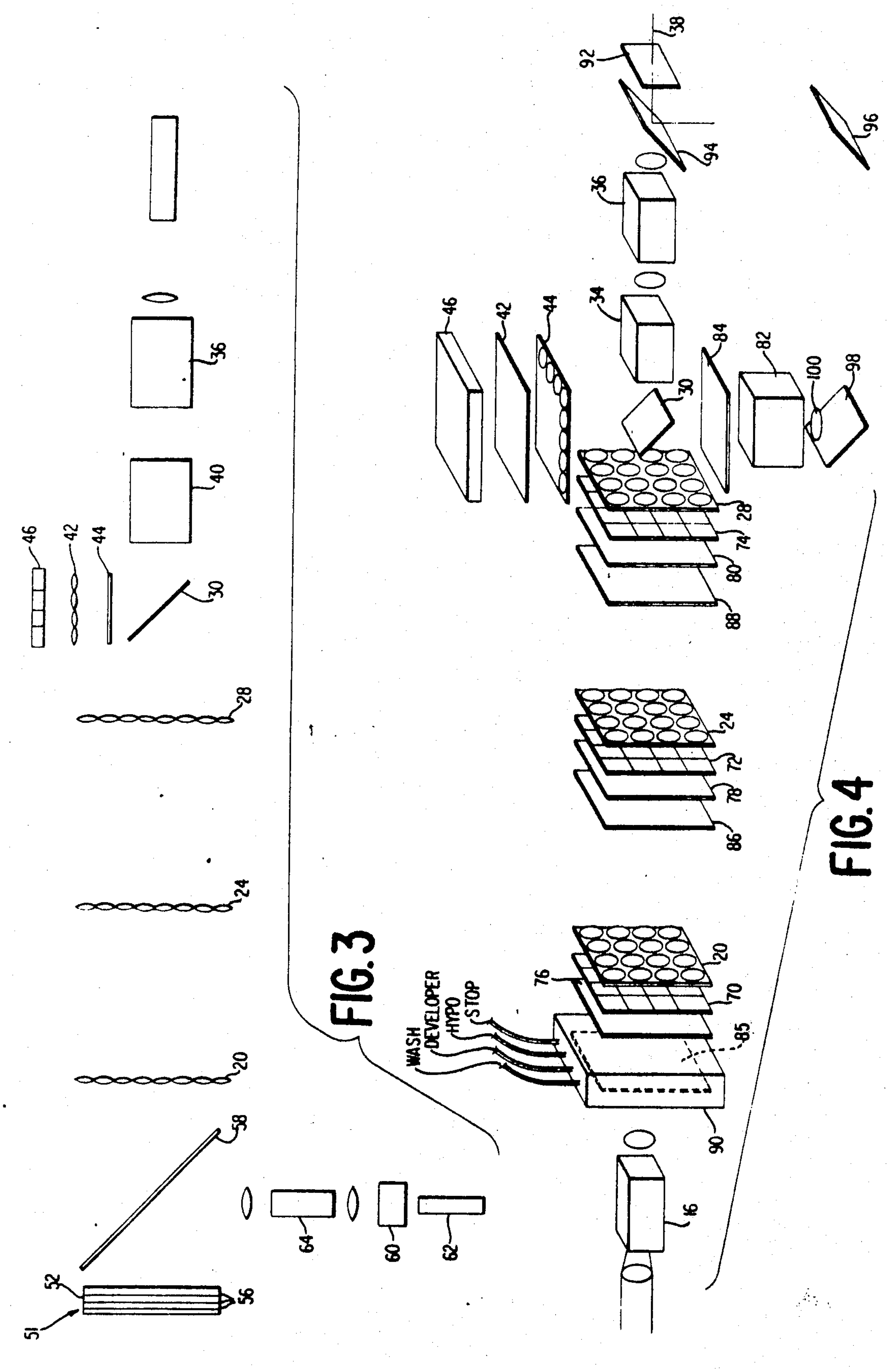

The system of FIG. 3 has been modified to accommodate a Lippmann film memory 51 in place of the memory plane 10 of FIG. 1. Memory 51 is formed by the Lippmann process and basically consists of a photographic emulsion layer 52. In storing information in the thickness of the film as well as across its face, information is stored in layers generally indicated by the reference numeral 56. Information may be retrieved from the film by interrogating the film in each position thereof with different frequencies identical to the frequencies used to form the storage layers. In view of the ability of a Lippmann film to store information in its thickness, the capacity of the memory of FIG. 1 may be increased by a factor of from 10 to 100.

The read out system is quite similar to that shown in FIG. 1, with the exception that the information is read out by reflection and the readout beam has different wavelengths or frequencies depending upon the information in the memory which is to be read out. More specifically, FIG. 3 includes in addition to the Lippmann film 51, a beam splitter 58 and an electro-optic laser beam frequency selector 60 which selects a desired frequency from the laser beam generated by the laser 62. The selected frequency is directed to the desired position on the film memory 51 by a digital light deflector 64. The data in the memory corresponding to the selected frequency is then reflected from the memory through beam splitter 58 and through the various lens arrays to the optical AND gate in the manner described in connection with FIG. 1. In the computer used to control the read out of the memory, part of the address of the desired data will be used to select the proper laser frequency and another part to control the deflector 64 to attain the desired position.

The transmission and number of stages in the deflector 36 for the systems of FIGS. 1 and 3 depend upon the number of words in the block. For example, if there are 25 words per block with 100 bits per word, the deflector would require five stages ($2^5=32$).

With slight modifications, the systems of FIG. 1 and FIG. 3 can be used to write information directly onto the storage medium as well as to read out information therefrom. FIG. 4 illustrates the manner in which the system of FIG. 1 is modified to permit writing. The same reference numerals have been utilized in FIGS. 1 and 3 to identify corresponding components. In essence, to obtain the writing feature, it is necessary to add to the system of FIG. 1 an electro-optic switch for each lens in the lens arrays 20, 24 and 28, an analyzer associated with each lens array, an additional light deflector, three diffusing screens, one at the output of the additional deflector and one at each of the image planes 22 and 26, and an automatic photographic emulsion developing system.

The additional electro-optic switches are identified by the reference numerals 70, 72 and 74. The corresponding analyzers are identified by reference numerals 76, 78 and 80. The additional light deflector is identified by the reference numeral 82 and its associated diffusing screen by the reference numeral 84. Diffusing screens 86 and 88 are associated with the image planes 22 and 26, respectively. The automatic photographic emulsion developing system is identified by the reference numeral 90.

The block of a memory film plane 85 into which bits are to be written is selected by operating the corresponding electro-optic switch in each of the three switch arrays 70, 72 and 74, whereby light passed through the operated switches will be passed by the associated analyzers, but the light passing through the non-operated switches will be blocked. The bit position in this field is selected by a spot of light from the light deflector 82. The input for deflector 82 is derived from light beam 38 through an electro-optic switch 92. The light beam is reflected from a beam splitter 94 and then from mirrors 96 and 98 through a lens 100 to the input of deflector 82. External means, such as a computer (not shown), positions the output of deflector 82 on the screen 84 at the point corresponding to the bit to be written in. The spot of light from screen 84 is then reflected from beam splitter 30 to all the lenses on lens array 28. However, only the light from the lens corresponding to the operated switch in switch array 74 will pass through analyzer 80 to be imaged on screen 88. The analyzer is oriented to block light linearly polarized in the direction of the output light from deflector 82, and the operation of an electro-optic switch in array 74 changes the polarization of the light so that some light will pass through the analyzer, whereas the light passing through the other switches will be blocked by the analyzer.

Similarly, the lenses in array 24 would image the spot from screen 88 on screen 86 were it not for the electro-optic switches 72. Again, only light from the lens corresponding to the operated electro-optic switch in array 72 will pass through the analyzer 78 to be imaged on screen 86. Similarly, the lenses in lens array 20 would image the single spot from screen 86 on the memory film 85, but only the light from the lens associated with the operated electro-optic switch in switch array 70 passes through analyzer 76 to the selected position on the photographic film 85.

The photographic memory film 85 is contained in the automatic developing system 90 such that the film can be developed automatically without any physical movement of the film. The developer, stop, hypo and wash solution are pumped into and out of the system 90. This automatic developing feature assures registration on read out.

While the invention has been particularly shown and described with reference to a preferred embodiment thereof, it will be understood by those skilled in the art that various changes in form and details may be made therein without departing from the spirit and scope of the invention.

What is claimed is:

1. In a data processing system including an optical memory plane having bit positions contained in XY memory blocks arranged in X columns and Y rows of blocks, means for optically selecting one of said memory blocks comprising:

(a) radiant energy generating means for generating a light beam, (b) light deflection means receiving said light beam and deflecting it to illuminate a selected one of said memory blocks, (c) a first array of AB first lenses located adjacent said memory plane and arranged A columns and B rows, said first array optically dividing said XY memory blocks into AB first fields of XY/AB blocks each, said first lenses being oriented to image on a first image plane said memory blocks such that memory blocks in corresponding positions of each of said fields are imaged on the same area on said first image plane, (d) a second array of CD second lenses located adjacent said first image plane and arranged in C columns and D rows, said second array optically dividing said first image plane into CD second fields of AB/CD second blocks each, said second lenses being oriented to image on a second image plane said second blocks such that the blocks in corresponding positions of each of said second fields are imaged on the same area of said second image plane, where XY equals the product of AB and CD, so that, when a selected block in said memory plane is illuminated by a light beam, only that selected block is magnified and imaged on said second image plane, (e) an optical AND gate having a first optical input, a second optical input and an optical output, said input being located in said second image plane so that said selected memory blocks is imaged on said first optical input, and (f) means optically selecting at said second input a bit position in the imaged block to produce a signal at the optical output if a bit appears in the corresponding bit position of the block imaged on said first input.

2. The optical data processing system as defined in claim 1 wherein:

(a) said optical AND gate is polarization-sensitive, (b) wherein said means for optically selecting a bit position further comprises means for directing onto the selected bit position a beam linearly polarized in a first direction, and (c) further comprising an analyzer coupled to said optical output and oriented to block light polarized in said first direction, (d) said first optical input containing means responsive to the block image on said second imaged plane to change the polarization of light incident on said second optical input at a bit position corresponding to said bit so that light passes through said analyzer.

3. The optical data processing system as defined in claim 1 wherein:

(a) said memory plane is a Lippmann film containing blocks of bits stored in wavelength responsive layers therein, and (b) means for selecting a wavelength of said light beam in accordance with the information in the selected block.

4. The optical data processing system as defined in claim 1 further comprising:

(a) an array of AB first light switches associated with said first array of lenses, (b) an array of CD second light switches associated with said second array of lenses, only one switch in each array being operated to pass light, and (c) means for illuminating with a spot of light a selected bit position on said second image plane, whereby the light spot is imaged through said lens and switch arrays on the memory plane in the selected bit position of the selected block.

5. A data processing system as defined in claim 4:

(a) wherein said memory plane is an undeveloped photographic emulsion, and (b) further comprising means for developing the image spot on said emulsion.

6. In a data processing system including an optical memory plane having bit positions contained in XY memory blocks arranged in X columns and Y rows of blocks, means for optically selecting one of said memory blocks comprising:

(a) radiant energy generating means for generating a light beam;

(b) light deflecting means receiving said light beam and deflecting it to illuminate a selected one of said memory blocks, (c) a first array of AB first lenses located adjacent said memory plane and arranged in A columns and B rows, said first array optically dividing said XY memory blocks into AB first fields of XY/AB blocks each, said first lenses being oriented to image on a first image plane said memory blocks such that memory blocks in corresponding positions of each of said fields are imaged on the same area on said first image plane, (d) a second array of CD second lenses located adjacent said first image plane and arranged in C columns and D rows, said second array optically dividing said first image plane into CD second fields of AB/CD second blocks each, said second lenses being oriented to image on a second image plane said second blocks such that the blocks in corresponding positions of each of said second fields are imaged on the same area of said second image plane.

(e) a third array of EF third lenses located adjacent said second image plane and arranged in E columns and F rows, said third array optically dividing said second image plane into EF third fields of CD/EF third blocks each, said third lenses being oriented to image on a third image plane said third block such that the blocks in corresponding positions of each of said third fields are imaged on the same area of said third image plane, where XY equals the product of AB, CD and EF so that, when a selected block in said memory plane is illuminated by a light beam, only that selected block is magnified and imaged on said third image plane, (f) an optical AND gate having a first optical input, a second optical input and an optical output, said first input being located in said second image plane so that said selected memory block is imaged on said first optical input, and (g) means optically selecting at said second input a bit position in the imaged block to produce a signal at the optical output if a bit appears in the corresponding bit position of the block imaged on said first input .

7. The optical data processing system as defined in claim 6 wherein:

(a) said optical AND gate is polarization-sensitive, (b) wherein said means for optically selecting a bit position further comprises means for directing onto the selected bit position a beam linearly polarized in a first direction, and (c) further comprising an analyzer coupled to said optical output and oriented to block light polarized in said first direction, (d) said first optical input containing means responsive to the block image on said second image plane to change the polarization of light incident on said second optical input at a bit position corresponding to said bits so that light passes though said analyzer.

References Cited

UNITED STATES PATENTS

| | | | |
|---|---|---|---|
| 3,170,980 | 2/1965 | Pritchard | 350—96 X |
| 3,191,157 | 6/1965 | Parker et al. | 350—96 |
| 2,981,140 | 4/1961 | Ogle. | |
| 3,084,453 | 4/1963 | Brown. | |
| 3,151,520 | 10/1964 | Nadeau. | |
| 3,167,741 | 1/1965 | Brown. | |
| 3,440,620 | 4/1969 | French. | |

OTHER REFERENCES

Krolak et al., "The Optical Tunnel, A Versatile Electro-optical Tool," Journal of the SMPTE, vol. 72, No. 3, March 1963, pp. 177–180.

DAVID SCHONBERG, Primary Examiner

P. R. MILLER, Assistant Examiner

U.S. Cl. X.R.

350—147, 150, 167